US006468122B1

(12) United States Patent
Clements et al.

(10) Patent No.: US 6,468,122 B1
(45) Date of Patent: Oct. 22, 2002

(54) FUEL INJECTED ENGINE WITH CROSS SCAVENGING

(75) Inventors: Scott D. Clements, Salem; Richard T. Tunkieicz, Kenosha, both of WI (US); Peter E. Lucier, Chicago, IL (US); David F. Haman, Palm City, FL (US); Richard M. McChesney, Waukegan, IL (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/723,861

(22) Filed: Nov. 28, 2000

(51) Int. Cl.[7] .......................... B63H 21/38; F02B 75/02
(52) U.S. Cl. ...................... 440/88; 123/257; 123/276
(58) Field of Search ...................... 440/88; 123/257, 123/276

(56) References Cited

U.S. PATENT DOCUMENTS

| 4,774,919 | A | * | 10/1988 | Matsuo et al. | ............... 123/257 |
| 4,969,330 | A | * | 11/1990 | Groff et al. | ..................... 60/288 |
| 5,791,304 | A | * | 8/1998 | Taipale | ........................ 123/299 |
| 5,794,584 | A | * | 8/1998 | Gillespie | ..................... 123/257 |
| 5,970,945 | A | * | 10/1999 | Holtermann | ................ 123/259 |
| 6,338,327 | B1 | * | 1/2002 | Ogi et al. | .................... 123/257 |

* cited by examiner

Primary Examiner—Sherman Basinger
(74) Attorney, Agent, or Firm—Fletcher, Yoder & Van Someren

(57) ABSTRACT

An engine in which the cylinders are scavenged according to a cross scavenging technique. The engine includes one or more cylinders in each of which a piston is disposed for reciprocal motion. The engine further includes a direct fuel injection system that allows controlled input of fuel into each cylinder to promote more efficient operation of the cross scavenged engine.

31 Claims, 3 Drawing Sheets

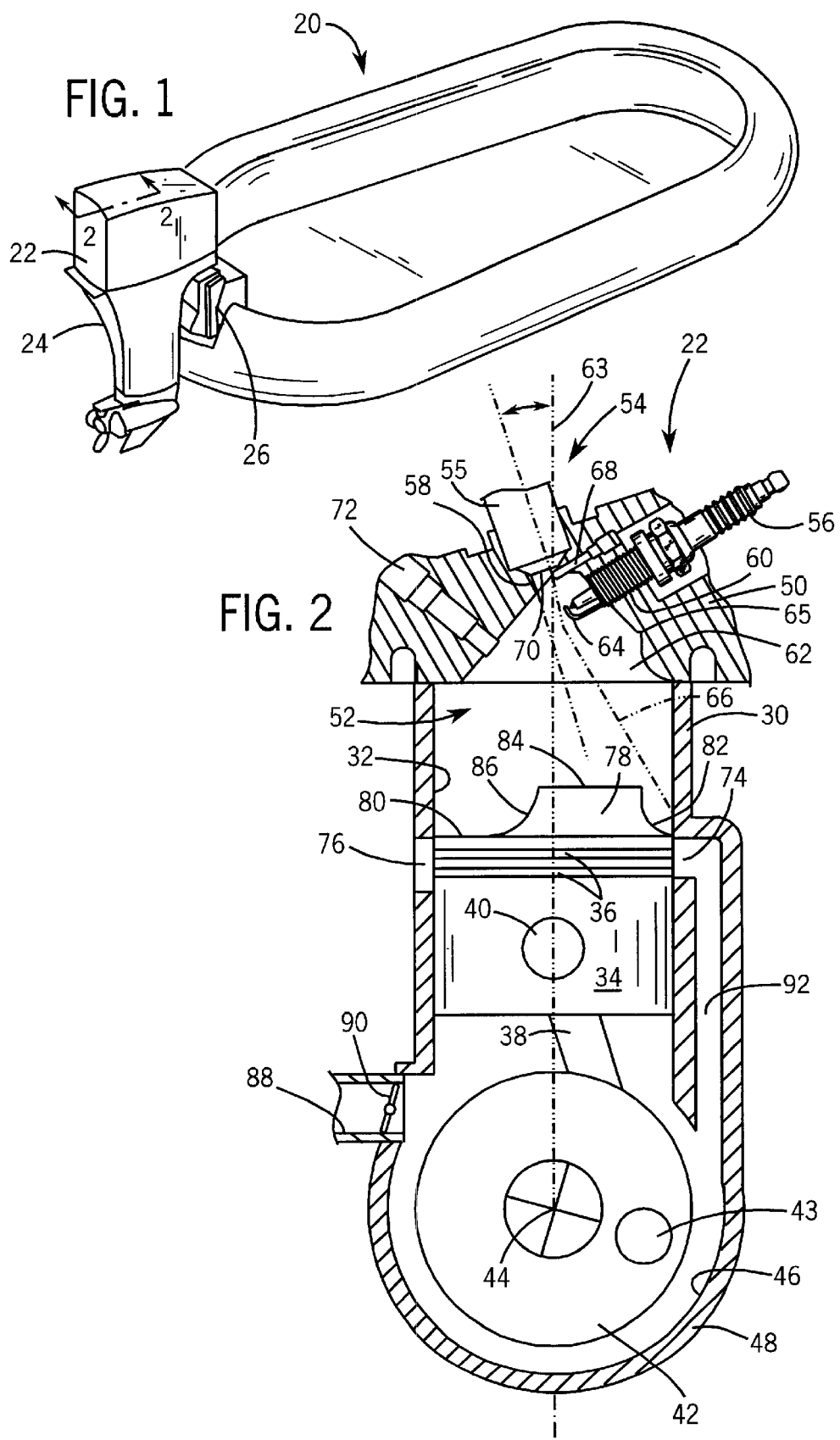

FUEL INJECTED ENGINE WITH CROSS SCAVENGING

FIELD OF THE INVENTION

The present invention relates generally to an internal combustion engine, and particularly to an internal combustion engine that utilizes fuel injection and cross scavenging.

BACKGROUND OF THE INVENTION

Internal combustion engines generally have one or more cylinders through which one or more pistons move in a reciprocating manner. Each piston is connected to a crankshaft by a connecting rod able to deliver force from the piston to the crankshaft to rotate the crankshaft. Power to drive the piston is provided by igniting a fuel-air mixture disposed in the cylinder on a side of the piston opposite the connecting rod. The fuel-air mixture is ignited by some type of ignition device, such as a spark plug.

Some internal combustion engines, such as cylinder ported, two-stroke engines, utilize a scavenging process to promote mixing of the air and fuel. One type of scavenging process is referred to as loop scavenging. A loop scavenged engine includes two or more scavenge ports in each cylinder that are directed toward the side of the cylinder away from the exhaust port. Generally, the inflow of air or air-fuel mixture is across a piston having an essentially flat top.

Another type of scavenging is referred to as cross scavenging. A cross scavenged engine or cylinder utilizes a deflector to deflect the mixture of air and fuel intaken through the scavenge or intake ports of each cylinder. Often, the deflector is formed on the crown of the piston in the form of a wall or barrier. This type of design utilizes scavenge ports and exhaust ports that are disposed on directly opposite sides of the cylinder, permitting the direct drilling of the scavenge and exhaust ports. This allows for a less expensive manufacturing process and permits closer cylinder-to-cylinder spacing. Additionally, at least some cross scavenged engines have relatively good fuel efficiencies and low emissions at low speed and/or part throttle.

It would be advantageous to gain the benefits of a cross scavenged engine design with improved control over combustion to promote starting, fuel economy and power of the engine throughout the range of engine speeds.

SUMMARY OF THE INVENTION

The present invention features a cross scavenged engine that can be used to power, for example, a watercraft. In one embodiment, the engine is utilized with an outboard motor which can be used to move a vehicle along a body of water. The performance of the engine is improved by utilizing a fuel injection system for injecting a fuel into the one or more cylinders of the engine. The injection of fuel improves the operating characteristics of a cross scavenged by cooling the piston during vaporization of the injected fuel. This vaporization, in turn, allows for a better burn or combustion in the one or more cylinders.

BRIEF DESCRIPTION OF THE DRAWINGS

The invention will hereafter be described with reference to the accompanying drawings, wherein like reference numerals denote like elements, and:

FIG. 1 is a perspective view of a watercraft powered by an exemplary engine, according to a preferred embodiment of the present invention;

FIG. 2 is a schematic cross-sectional view of a single cylinder in an exemplary two-stroke engine that may be utilized with the watercraft illustrated in FIG. 1;

DETAILED DESCRIPTION OF THE PREFERRED EMBODIMENTS

The present technique for better utilizing a cross scavenged engine can be used in a variety of engines and environments. For the sake of clarity and explanation, however, the invention is described in conjunction with an engine that operates on a two-stroke cycle and powers a watercraft. The exemplary embodiment described herein should not be construed as limiting, however, and has potential uses in other types of engines and applications.

Referring generally to FIG. 1, an exemplary application of the present system and methodology is illustrated. In this application, a watercraft 20, such as an inflatable boat, is powered by an engine 22 disposed in an outboard motor 24. In this embodiment, outboard motor 24 is mounted to a transom 26 of watercraft 20. Engine 22 is a two-stroke engine that is cross scavenged and utilizes a fuel injection system, as explained more fully below.

Figure 3:
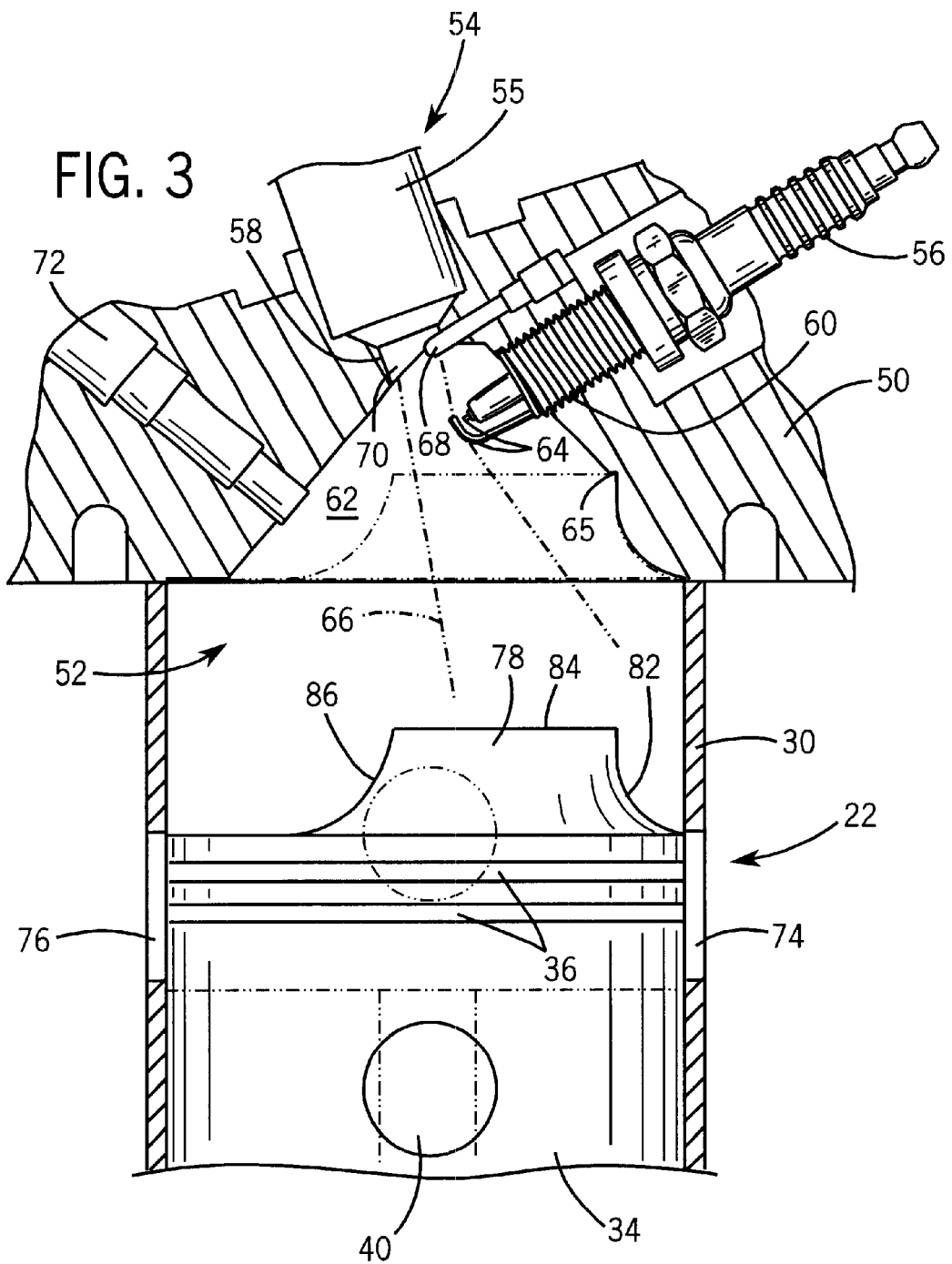
FIG. 3 is an enlarged view of the combustion chamber of the engine illustrated in FIG. 2.

Referring generally to FIGS. 2 and 3, a single cylinder of an exemplary two-stroke engine 22 is illustrated. In this embodiment, engine 22 includes at least one cylinder 30 having an internal cylinder bore 32 through which a piston 34 reciprocates. Piston 34 typically includes one or more rings 36 that promote a better seal between the piston 34 and cylinder bore 32 as piston 34 reciprocates within cylinder 30.

Piston 34 is coupled to a connecting rod 38 by a pin 40, sometimes referred to as a wrist pin. Opposite pin 40, connecting rod 38 is connected to a crankshaft 42 at a location 43 offset from a crankshaft central axis 44. Crankshaft 42 rotates about axis 44 in a crankshaft chamber 46 defined by a housing 48.

At an end of cylinder 30 opposite crankshaft housing 48, a cylinder head 50 is mounted to cylinder 30 to define a combustion chamber 52. Cylinder head 50 may be used to mount a fuel injection system 54 able to supply fuel to combustion chamber 52. In one preferred embodiment, fuel injection system 54 is a direct injection system having an injector or injector pump 55 mounted to cylinder head 50, generally above combustion chamber 52, to spray a fuel directly into the combustion chamber.

Cylinder head 50 also may be used to mount a spark plug 56 to ignite an air-fuel mixture in combustion chamber 52. Injector pump 55 and spark plug 56 are received in openings 58 and 60, respectively. Openings 58 and 60 may be formed through the wall that forms either cylinder head 50 or cylinder 30. In the illustrated embodiment, openings 58 and 60 both are formed through the wall of cylinder head 50 for communication with combustion chamber 52 within a recessed internal region 62 of cylinder head 50. Cylinder head 50 also may include a notch 65 that enhances mixing of the fuel and air.

By way of example, injector pump 55 may be generally centrally located at the top of cylinder head 50, as illustrated best in FIG. 3. In this exemplary embodiment, injector 55 is oriented at an angle with respect to the longitudinal axis 63 of cylinder 30. As illustrated, spark plug 56 also may be disposed at an angle such that its electrodes 64 are positioned in a fuel spray pattern 66 during injection of fuel into recessed region 62 of combustion chamber 52. Fuel spray pattern 66 is the "cone" or other pattern of fuel spray injected by injector pump 55.

A deflector pin 68 may be positioned such that it extends partially into fuel spray pattern 66 intermediate an injection nozzle 70 of injector pump 55 and electrodes 64 of spark plug 56. Deflector pin 68 reduces or eliminates the amount of fuel sprayed directly onto electrode 64. This, in turn, reduces the chance of fouling spark plug 56. Additionally, a combustion sensor 72, such as an oxygen sensor, may be positioned in communication with combustion chamber 52 within recessed region 62.

In a cross scavenged engine, cylinder 30 includes one or more intake or scavenge ports 74 and one or more exhaust ports 76. Generally, the scavenge port 74 and exhaust port 76 are disposed on generally opposite sides of cylinder 30 at a common axial or longitudinal distance along cylinder 30. The arrangement of ports makes it possible to drill, the scavenge and exhaust ports directly in a single operation performed from the exhaust port side. This greatly reduces the manufacturing costs of the cross scavenged engine as compared to an equivalent loop scavenged engine. The cross scavenged cylinder also includes a deflector 78 designed to deflect air incoming through scavenge port or ports 74 for promoting mixing of air and fuel in combustion chamber 52. In the illustrated embodiment, deflector 78 is disposed on a crown 80 of piston 34. An exemplary deflector 78 includes a front deflector face or wall 82, a top region 84 and a declined region 86 generally disposed towards the exhaust port side of piston 34. Cylinder head notch 65 preferably is positioned such that it is proximate the transition between front deflector wall 82 and top region 84 when piston 34 is at top dead center.

In operation, piston 34 travels towards cylinder head 50 to compress a charge of air within combustion chamber 52. Simultaneously, injector pump 55 injects fuel to create a fuel air mixture that is ignited by an appropriately timed spark across electrode 64. As piston 34 travels towards cylinder head 50, air is drawn through an inlet port 88 into crankshaft chamber 46 and cylinder 30 on a side of piston 34 opposite combustion chamber 52. A valve 90, such as a reed valve, allows the air to pass into engine 22 but prevents escape back through inlet port 88.

Upon ignition of the fuel-air charge in combustion chamber 52, piston 34 is driven away from cylinder head 50 past exhaust port 76 through which the exhaust gasses are discharged. As piston 34 moves past exhaust port 76, scavenge port 74 is fully opened. Air from crankshaft chamber 46 is forced along a transfer passage 92 and through scavenge port 74 into cylinder 30 on the combustion chamber side of piston 34. The incoming air is deflected upwardly by deflector 78 to facilitate removal of exhaust gasses through exhaust port 76 while providing a fresh charge of air for mixing with the injected fuel. Effectively, the downward travel of piston 34 compresses the air in crankshaft chamber 46 and forces this fresh charge of air into cylinder 30 for mixing with the next charge of fuel and ignition by spark plug 56.

Preferably, the angle of injector pump 55 is selected to direct fuel spray pattern 66 generally towards the internal wall of cylinder 30 proximate scavenge port 74. This aids in the mixing of fuel and air as the incoming air, deflected upwardly by deflector 78, meets the charge of fuel injected through injection nozzle 70. In an exemplary embodiment, if the injector nozzle 70 is disposed near longitudinal axis 63 and the bore/stroke ratio is approximately 1, the angle between injector pump 55 and longitudinal axis 63 is preferably in the range from 5 to 25 degrees. Regardless of the angle, it is preferred that injector pump 55 be positioned and/or angled such that a majority of the fuel spray is directed into the hemisphere or side of cylinder 30 having scavenge port 74.

The actual amount of fuel injected and the timing of the injection can vary greatly depending on a variety of factors, including engine size, engine design, operating conditions, engine speed, etc. However, the utilization of fuel injection system 54 and the precise control over injector 55 allows the amount of fuel injected and the timing of the ignition to be carefully controlled. Also, the heat otherwise retained in piston 34 and deflector 78 is removed as fuel is sprayed onto the piston and vaporized. These factors permit increases in efficiency, fuel economy and power that would otherwise not be achievable with cross scavenged engines. The factors also permit a variety of fuels to be utilized in engine 22.

Figure 4:
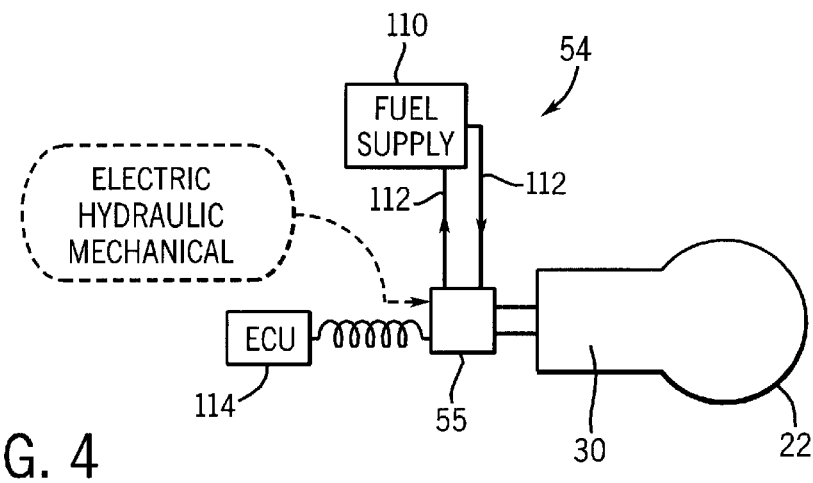
FIG. 4 is a schematic representation of an exemplary fuel delivery system utilizing a fuel-only direct injection system.
Figure 5:
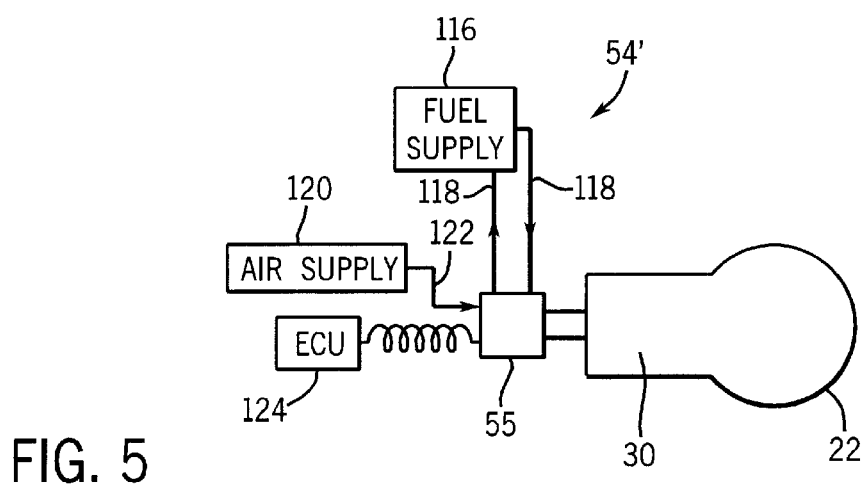
FIG. 5 is a schematic representation of an alternate fuel delivery system for direct injection of fuel and air.
Figure 6:
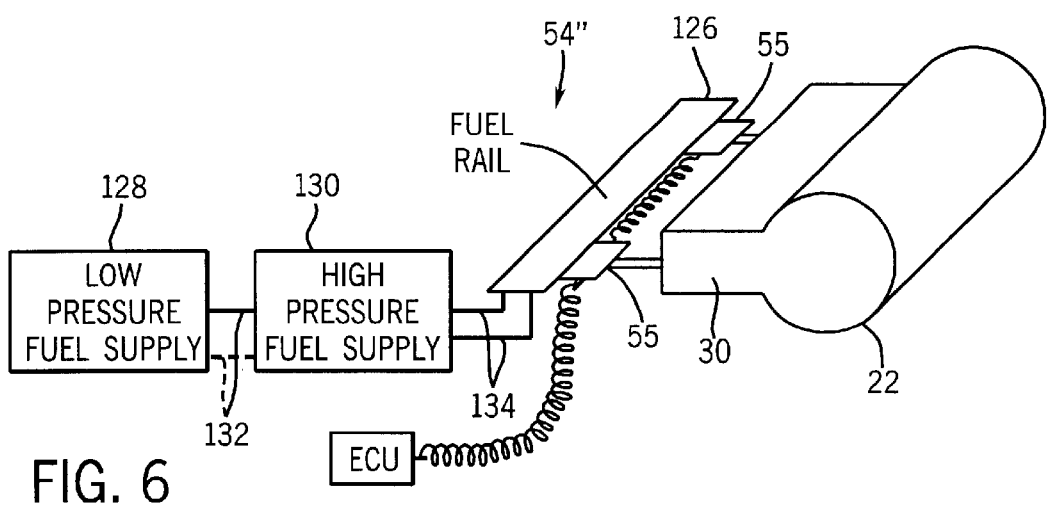
FIG. 6 is a schematic representation of an alternate fuel delivery system utilizing a fuel rail.

Referring generally to FIGS. 4 through 6, exemplary fuel injection systems 54 are illustrated. In FIG. 4, fuel injection system 54 comprises a direct fuel injection system in which only liquid fuel is directly injected into cylinder 30 of engine 22. Fuel is supplied to injector 55 via a fuel reservoir 110, e.g., a low pressure fuel supply such as a fuel tank, and fuel supply lines 112. In this embodiment, fuel injector 55 may be of a variety of injector types, including electrically, hydraulically or mechanically actuated injectors. In this type of system, a pressure pulse created in the liquid fuel forces a fuel spray to be formed at the mouth or outlet of nozzle 70 for direct, in-cylinder injection. The operation of injector 55 is controlled by an electronic control unit (ECU) 114. The ECU 114 typically includes a programmed microprocessor or other digital processing circuitry, a memory device such as an EEPROM for storing a routine employed in providing command signals from the microprocessor, and a drive circuit for processing commands or signals from the microprocessor, as known to those of ordinary skill in the art.

An alternate embodiment of fuel injection system 54, labeled 54' is illustrated in FIG. 5. In this embodiment, both fuel and air are directly injected into cylinder 30 of engine 22 by injector 55. Fuel is supplied via a fuel reservoir 116, e.g., a low pressure fuel supply such as a fuel tank, and fuel supply lines 118. Additionally, high pressure air is supplied to injector 55 via an air supply 120 and air supply line 122. Again, the activation of injector 55 is controlled by an ECU 124. In this type of system, both the air and the fuel for combustion are provided by injector 55.

Another embodiment of fuel injection system 54, labeled 54", is illustrated in FIG. 6. In this embodiment, a fuel rail 126 is utilized to supply fuel to one or more cylinders 30 of engine 22. Fuel rail 126 supply high pressure fuel to injectors 55, which are actuated between an open and a closed position to selectively permit the injection of high pressure fuel into one or more cylinders 30, as known to those of ordinary skill in the art.

In the embodiment illustrated, a low pressure fuel supply 128 provides fuel to a high pressure fuel supply 130 via appropriate fuel lines 132. High pressure fuel supply 130, in turn, supplies fuel under injection pressure to fuel rail 126 via supply lines 134.

It will be understood that the foregoing description is of preferred exemplary embodiments of this invention, and that the invention is not limited to the specific form shown. For example, the fuel injection systems described are exemplary embodiments, but a variety of injection systems can be utilized with the exemplary cross scavenged engine. Additionally, a variety of engine configurations, displacements, cylinder numbers, piston designs, scavenge port designs and exhaust port designs can be utilized. These and other modifications may be made in the design and arrangement of the elements without departing from the scope of the invention as expressed in the appended claims.

What is claimed is:

1. An engine, comprising:
   a cylinder comprising a scavenge port through which air enters the cylinder,
   a piston disposed in the cylinder for reciprocal motion, wherein the piston includes a deflector to enhance the mixing of fuel and air within the cylinder;
   a cylinder head disposed over the cylinder and including a recessed internal region; and
   a direct fuel injection system including a fuel injector disposed within the recessed internal region of the cylinder head such that the fuel injector is oriented to inject a fuel directly into the cylinder at an angle in relation to the vertical axis of the cylinder and towards the scavenge port, wherein the cylinder is scavenged according to a cross scavenging process.

2. The engine as recited in claim 1, further comprising a fuel injector deflector to enhance the mixing of fuel and air within the cylinder.

3. The engine as recited in claim 1, wherein the deflector is disposed on a crown of the piston.

4. The engine as recited in claim 3, wherein the cylinder head includes a notch to further enhance mixing of fuel and air.

5. The engine as recited in claim 1, wherein the direct fuel injection system comprises a fuel-only direct injection system.

6. The engine as recited in claim 1, wherein the cylinder includes a plurality of scavenge ports through which air enters the cylinder.

7. The engine as recited in claim 1, wherein the direct fuel injection system is oriented to inject a fuel spray towards the scavenge port such that a majority of the fuel spray enters a hemisphere of the cylinder where the scavenge port is located.

8. The engine as recited in claim 1, wherein the cylinder includes an exhaust port disposed to share an axis with the scavenge port.

9. The engine as recited in claim 1, wherein the direct fuel injection system comprises a fuel and air direct injection system.

10. The engine as recited in claim 1, wherein the direct fuel injection system comprises a fuel rail.

11. The engine of claim 1, wherein the fuel injector injects the fuel towards a spark plug.

12. The engine of claim 11, wherein a fuel injector deflector reduces the amount of the fuel injected onto the spark plug.

13. A power source for a watercraft, comprising:
    an outboard motor having a two-stroke engine scavenged according to a cross scavenging process; the engine comprising:
    a cylinder;
    a cylinder head disposed over the cylinder and having a recessed internal region;
    a scavenge port through which air enters the cylinder; and
    a direct fuel injection system having a fuel injector disposed within the recessed internal region of the cylinder head such that the fuel injector is oriented to inject a fuel spray directly into the cylinder at an angle in relation to the vertical axis of the cylinder and towards the scavenge port.

14. The power source as recited in claim 13, further comprising a fuel injector deflector to enhance mixing of fuel and air within the cylinder.

15. The power source as recited in claim 14, wherein at least a portion of the fuel spray is injected onto the fuel injector deflector.

16. The power source as recited in claim 13, wherein a deflector is disposed on a crown of a piston of the engine.

17. The engine as recited in claim 13, wherein the cylinder head includes a notch to further enhance mixing of fuel and air.

18. The power source as recited in claim 13, wherein the direct fuel injection system comprises a fuel-only direct injection system.

19. The power source as recited in claim 13, wherein the direct fuel injection system is oriented to inject a majority of the fuel spray into the scavenge port side of the cylinder.

20. The power source as recited in claim 13, wherein the cylinder includes an exhaust port disposed to share a central axis with the scavenge port.

21. The engine of claim 13, wherein the fuel injector injects the fuel spray towards a spark plug.

22. The engine of claim 21, wherein a fuel injector deflector reduces the amount of the fuel spray injected onto the spark plug.

23. A watercraft, comprising:
    a vehicle able to float on water; and
    an engine to power the vehicle, the engine comprising:
    a cylinder
    a cylinder head having a recessed internal region;
    a piston disposed for reciprocal motion within the cylinder;
    a scavenge port through which air enters the cylinder; and
    a direct fuel injection system having a fuel injector disposed in the recessed internal region such that the fuel injector is oriented to directly inject a fuel into the cylinder at an angle towards the scavenge port, wherein the cylinder is cross scavenged.

24. The watercraft as recited in claim 23, further comprising a fuel injector deflector to enhance mixing of fuel and air within the cylinder.

25. The watercraft as recited in claim 24, further comprising a deflector disposed on a crown of the piston.

26. The watercraft as recited in claim 23, wherein the fuel injection system comprises a fuel-only direct injection system that injects fuel directly into the cylinder.

27. The watercraft as recited in claim 23, wherein the direct fuel injection system directly injects a mixture of fuel and air.

28. A fuel injected engine that has a combustion chamber formed of a cylinder head disposed on top of a cylinder, wherein air may be introduced into the combustion chamber through a scavenge port, comprising:
    means for directly injecting fuel into a cylinder having a reciprocal piston disposed therein, the means for directly injecting fuel injecting the fuel at an angle in relation to a central axis of the cylinder and towards the scavenge port through the cylinder head, the piston including a deflector to enhance mixing of fuel and air;

means for introducing air into the cylinder; and means for cross scavenging the engine.

29. A method for operating an internal combustion engine that has a combustion chamber formed of a cylinder head disposed on top of a cylinder, wherein air may be introduced into the combustion chamber through a scavenge port, comprising:

reciprocating a piston having a deflector to enhance the mixing of fuel and air through the cylinder of an engine;

injecting a fuel directly into the cylinder through the cylinder head, such that the fuel is injected at an angle in relation to a central axis of the cylinder and towards the scavenge port;

introducing air into the cylinder; and scavenging the engine by a cross scavenging process.

30. The method as recited in claim 29, wherein introducing comprises introducing air through a scavenge port independent of the fuel.

31. The method as recited in claim 30, wherein scavenging comprises deflecting the air introduced through the scavenge port.

* * * * *